United States Patent
Sayani et al.

(10) Patent No.: US 12,220,364 B2
(45) Date of Patent: Feb. 11, 2025

(54) AUTOMATED AIR MATTRESS BED SYSTEM

(71) Applicant: The Aga Khan University, Karachi (PK)

(72) Inventors: Saleem Sayani, Wynnewood, PA (US); Muhammad Abdul Muqeet, Karachi (PK); Hafiz Imtiaz Ahmed, Karachi (PK); Shahrukh Sharif, Karachi (PK)

(73) Assignee: The Aga Khan University

( * ) Notice: Subject to any disclaimer, the term of this patent is extended or adjusted under 35 U.S.C. 154(b) by 802 days.

(21) Appl. No.: 17/411,757

(22) Filed: Aug. 25, 2021

(65) Prior Publication Data

US 2022/0370271 A1    Nov. 24, 2022

(30) Foreign Application Priority Data

May 20, 2021   (PK) ................................. 370/2021

(51) Int. Cl.
*A61G 7/05*   (2006.01)
*A61G 7/057*   (2006.01)
(Continued)

(52) U.S. Cl.
CPC ....... *A61G 7/05776* (2013.01); *G05D 7/0617* (2013.01); *G05D 7/0623* (2013.01);
(Continued)

(58) Field of Classification Search
CPC ............ A61G 7/05776; A61G 2203/12; A61G 2203/20; A61G 2203/34; A61G 2210/70;
(Continued)

(56) References Cited

U.S. PATENT DOCUMENTS

| 2005/0011738 A1* | 1/2005 | Smith ................... A61B 5/1113 |
| | | 200/85 R |
| 2009/0093912 A1* | 4/2009 | Wilker, Jr. ........... A61G 7/0524 |
| | | 700/282 |

(Continued)

*Primary Examiner* — Michael J Brown
(74) *Attorney, Agent, or Firm* — Fish & Richardson P.C.

(57) ABSTRACT

A mattress assembly includes: multiple gas-filled chambers each having a top surface, the top surfaces of the chambers collectively composing a top surface of the mattress assembly; multiple composite sensors each associated with a corresponding chamber. Each composite sensor includes a pressure sensor to measure a pressure at a wall of the corresponding chamber and a temperature sensor to measure a temperature of the corresponding chamber. The assembly includes chamber regulators each in communication with a corresponding chamber, each regulator configured to pump gas at a first, higher temperature and gas at a second temperature to the corresponding chamber. The assembly includes a controller in communication with the composite sensors and chamber regulators, programmed to: receive, from composite sensor(s), state data including pressure and temperature information for the chamber corresponding to the composite sensor; determine, based upon the received state data, information about a patient's position relative to the corresponding chamber; and based on the patient's position, control the chamber regulator for the chamber to modify a pressure and/or a temperature of the chamber.

18 Claims, 11 Drawing Sheets

(51) Int. Cl.
*G05D 7/06* (2006.01)
*G05D 16/08* (2006.01)
*G05D 23/12* (2006.01)

(52) U.S. Cl.
CPC ............. *G05D 16/08* (2013.01); *G05D 23/12* (2013.01); *A61G 2203/12* (2013.01); *A61G 2203/20* (2013.01); *A61G 2203/34* (2013.01); *A61G 2210/70* (2013.01); *A61G 2210/90* (2013.01)

(58) Field of Classification Search
CPC ........... A61G 2210/90; A61G 2203/46; G05D 7/0617; G05D 7/0623; G05D 16/08; G05D 23/12
USPC ......................................................... 700/282
See application file for complete search history.

(56) References Cited

U.S. PATENT DOCUMENTS

| | | |
|---|---|---|
| 2009/0216466 A1 | 8/2009 | Altman et al. |
| 2013/0006151 A1 | 1/2013 | Main et al. |
| 2014/0325760 A1* | 11/2014 | Murai ................... A61G 7/018 5/616 |
| 2015/0026896 A1 | 1/2015 | Fleury et al. |
| 2019/0104858 A1 | 4/2019 | Erko et al. |
| 2019/0133332 A1 | 5/2019 | Zaiss et al. |
| 2019/0231084 A1 | 8/2019 | Nunn et al. |

* cited by examiner

AUTOMATED AIR MATTRESS BED SYSTEM

RELATED APPLICATION

This disclosure claims priority to Pakistan Patent Application No. 370/2021, entitled "Automated Mattress Assembly" and filed on May 20, 2021, the entire contents of which is incorporated herein by reference.

FIELD

The disclosure relates to automated mattress assemblies and more specifically, to the risk reduction of decubitus ulcers using an adjustable mattress assembly.

BACKGROUND

Patients confined to a bed or wheel chair for extended periods are at risk of developing pressure ulcers, i.e., decubitus ulcer, commonly called 'bedsores'. These ulcers often develop within soft tissues compressed between a bed or chair surface and the patient's weight-bearing bony prominences. The compressed tissue becomes partially or completely deprived of oxygenated blood flow and can result in cell death. Further injury can occur due to reperfusion when blood re-enters the already-damaged soft tissue.

An accepted means of reducing the risk of decubitus ulcer development in immobile patients is to bodily turn the entire patient to a new position where the previously compressed tissue no longer bears weight. This induces regular movement of affected tissues and redistributes pressure away from affected soft tissue surfaces of a patient. Further mechanical approaches to dealing with decubitus ulcers aim to reduce the severity of decubitus ulcers with static mattresses or pads composed of high specification or high density foam designed to more uniformly distribute pressure upon the bony prominences of a patient.

SUMMARY

This disclosure features a mattress assembly with adjustable pressurized chambers to dynamically distribute pressure along the soft tissues of a recumbent patient. The mattress assembly includes individually inflatable chambers for supporting the weight a user, and each chamber includes a connected Peltier cooler-based temperature control system to ensure the comfort of the user. The assembly allows for discrete control of the pressure of each chamber, or a set of chambers, within the assembly. For example, a chamber or set of chambers can be specifically adjusted to vary the pressure beneath the head, feet, hips, or upper torso of a user. The configuration of the mattress assembly accommodates the size and weight of a user and can store and recall individual pressure profiles for each.

An integrated controller allows the user to select and retain pressure and temperature settings for each chamber, or a collection of chambers, of the air mattress assembly. Pressure sensors embedded in each chamber monitor pressure changes and instruct the controller to increase or decrease pressure based on user preferences. Additionally, the controller can be programmed to follow an automatic schedule determined and input to the controller by a user or clinician, pressurizing chambers at specific time intervals to shift the weight of a patient on a regular basis. The controller can further communicate wirelessly with a mobile device of a user or clinician, allowing adjustments of the mattress assembly without requiring medical personnel intervention.

In general, in a first aspect, the disclosure features a mattress assembly, including: multiple gas-filled chambers each having a top surface, the top surfaces of the chambers collectively composing a top surface of the mattress assembly; multiple composite sensors, each composite sensor being associated with a corresponding chamber. Each composite sensor includes a pressure sensor arranged to measure a pressure at a wall of the corresponding chamber and a temperature sensor arranged to measure a temperature of the corresponding chamber. The assembly further includes multiple chamber regulators, each chamber regulator being in fluid communication with a corresponding chamber, each chamber regulator being configured, during operation of the mattress assembly, to pump gas at a first temperature and gas at a second temperature to the corresponding chamber, the first temperature being greater than the second temperature. The assembly also includes a controller in communication with the composite sensors and the chamber regulators, the controller being programmed to: receive, from at least one composite sensor, state data including pressure and temperature information for the chamber corresponding to the composite sensor; determine, based upon the received state data, an information about a patient's position relative to the corresponding chamber; and based on the patient's position, control the chamber regulator for the corresponding chamber to modify a pressure and/or a temperature of the corresponding chamber.

Embodiments of the assembly can include one or more of the following features and/or features of other aspects. For example, each composite sensor can include a second pressure sensor arranged to measure a pressure at a second wall of the corresponding chamber, the second wall of the chamber opposing the wall at which the first pressure sensor measures the pressure.

Each regulator can include a first compartment and a second compartment separated from the first compartment by a divider, the first compartment containing gas at the first temperature and the second compartment containing gas at the second temperature. The divider can include a heat exchanger arranged to transfer heat from the gas in the second compartment to the gas in the first compartment. The heat exchanger can include a thermoelectric element.

The information about the patient's position can include an occupancy state for the corresponding chamber.

The information about the patient's position can include an occupancy-time value for the corresponding chamber. The controller can be programmed to modify the temperature and/or pressure when the occupancy-time value exceeds an occupancy-time threshold value.

The controller can be programmed to adjust the temperature and pressure of each chamber according to an automatic adjustment profile established for a patient. The automatic adjustment profile can include one or more threshold values for an occupancy-time for each chamber and the controller is programmed to adjust the temperature and/or pressure of a chamber when a threshold value for that chamber is exceeded.

The assembly can include a remote control in communication with the controller. The controller can be programmed to adjust a pressure and/or temperature of one or more of the chambers based on commands received from the remote control. The remote control can be mobile device.

The top surface of the mattress assembly can have a surface area in a range from 0.8 m² to 4 m².

In general, in a further aspect, the disclosure features a method, including: for each of multiple gas-filled chambers composing a surface of a mattress, monitoring a pressure and a temperature of the chamber; determining, based on the monitored pressure and temperature, a position of a patient on the mattress; determining, based on the position of the patient on the mattress, whether the time the patient has remained in the same position exceeds a threshold; and modifying, when the time exceeds the threshold, a pressure and/or a temperature of at least one chamber of the plurality of chambers.

Implementations of the method can include one or more of the following features and/or features of other aspects. For example, modifying the pressure and/or temperature can include pumping gas at a first temperature into the chamber. The first temperature can be higher than the monitored temperature of the chamber. Alternatively, in some embodiments, the first temperature is lower than the monitored temperature of the chamber.

Modifying the pressure and/or temperature can include drawing gas from the chamber.

The method can include transferring heat between two bodies of gas each separately in fluid communication with the gas in a corresponding one of the chambers, and modifying the temperature and/or pressure in the corresponding chamber comprises transferring gas between at least one of the two bodies and the corresponding chamber.

Among other advantages, the mattress assembly disclosed herein provides individual chamber pressure adjustment to specifically meet the needs of a user. The real-time monitoring of integrated pressure sensors allow for immediate response to variations in user position. Built-in pressure sensors automatically identify the pressure applied to the mattress at one or more positions and determines if the bed is vacant or in-use by an individual.

Automated pressure balancing can relieve compression from pain areas of a user, particularly helpful for users confined to the mattress who may be in danger of developing, or have developed, decubitus ulcers. The automatic pressure-balancing feature of the mattress assembly is designed for users confined to a mattress for extended periods, whether through infirmity or injury. The pressure balancing shifts the load from areas experiencing fatigue or pain to healthy or less painful areas, thereby minimizing pressure applied to vulnerable tissues. The pressure balancing can also take into account the size and shape of a user by providing extra pressure on localized regions when needed, such as the buttocks, shoulders, or knees of a user.

The mattress utilizes an integrated controller to allow for programmable, scheduled movement for users. For example, a movement schedule can be programmed into the controller to aid users experiencing decubitus ulcers, ensuring joints move and existing pressure points experience relief after user- or clinician-defined time periods.

Alternatively, or additionally, the mattress assembly can be controlled through an application on a mobile device. Control of the assembly through a mobile device allows a caretaker to make pressure or temperature changes through the application, thereby eliminating the need to rouse the user from sleep to make manual adjustments to the bed or user position.

Additional advantages can be realized due to minimal resource requirement, simple design, and portability of the device. The assembly is cost-effectively designed for users in low and middle-income countries with low resource utilization. The device enables users and healthcare providers to monitor pressure experienced by users undergoing prolonged bed rest or treatment for decubitus ulcers.

Other advantages will be apparent from the description, the drawings, and the claims.

BRIEF DESCRIPTION OF THE DRAWINGS

In the figures, like symbols indicate like elements.

DETAILED DESCRIPTION

Conventional systems for pressure control in an air mattress can suffer from one or more drawbacks. For example, conventional systems may not regulate temperature and/or pressure of individual air capsules in conditions where regularly scheduled patient movements, such as patient turns, are necessary. Such systems may not reliably reduce pressure build-up on soft tissues beneath bony prominences of the patient, such as beneath hips, feet, or shoulders.

Similarly, a system's inability to accurately sense temperature changes can undermine the therapeutic efficiency and slow a treatment process of decubitus ulcers a user is experiencing. In addition, without responsive remote control, it may be difficult for the user to make adjustments on their own. Also, conventional systems can automatically notify nursing staff if the patient has not moved during some predetermined time period, so that the staff knows to manually reposition the patient. However, this typically involves having an attendant bodily move the patient, possibly rousing them from slumber.

This disclosure features dynamic air mattress assemblies including a collection of pressure- and temperature-adjustable chambers, a corresponding number of chamber regulators, and a controller. The controller is programmed to detect the presence and orientation of a patient, and modify the pressure under bony prominence of the patient according to a schedule. By varying the pressure under weight-bearing prominences, the development of decubitus ulcers can be delayed.

The controller of the dynamic mattress assemblies is configured to automatically, without user or attendant intervention, follow a pre-programmed automatic adjustment profile to maintain a time-dependent series of pressure and temperature values within the chambers of a mattress assembly. The controller is also configured to transmit and receive commands from a remote control unit. This can allow a user, an attendant, or a family member to remotely manipulate pressures and temperatures of one or more chambers disposed beneath a patient to prevent or delay the development of decubitus ulcers.

Figure 1:
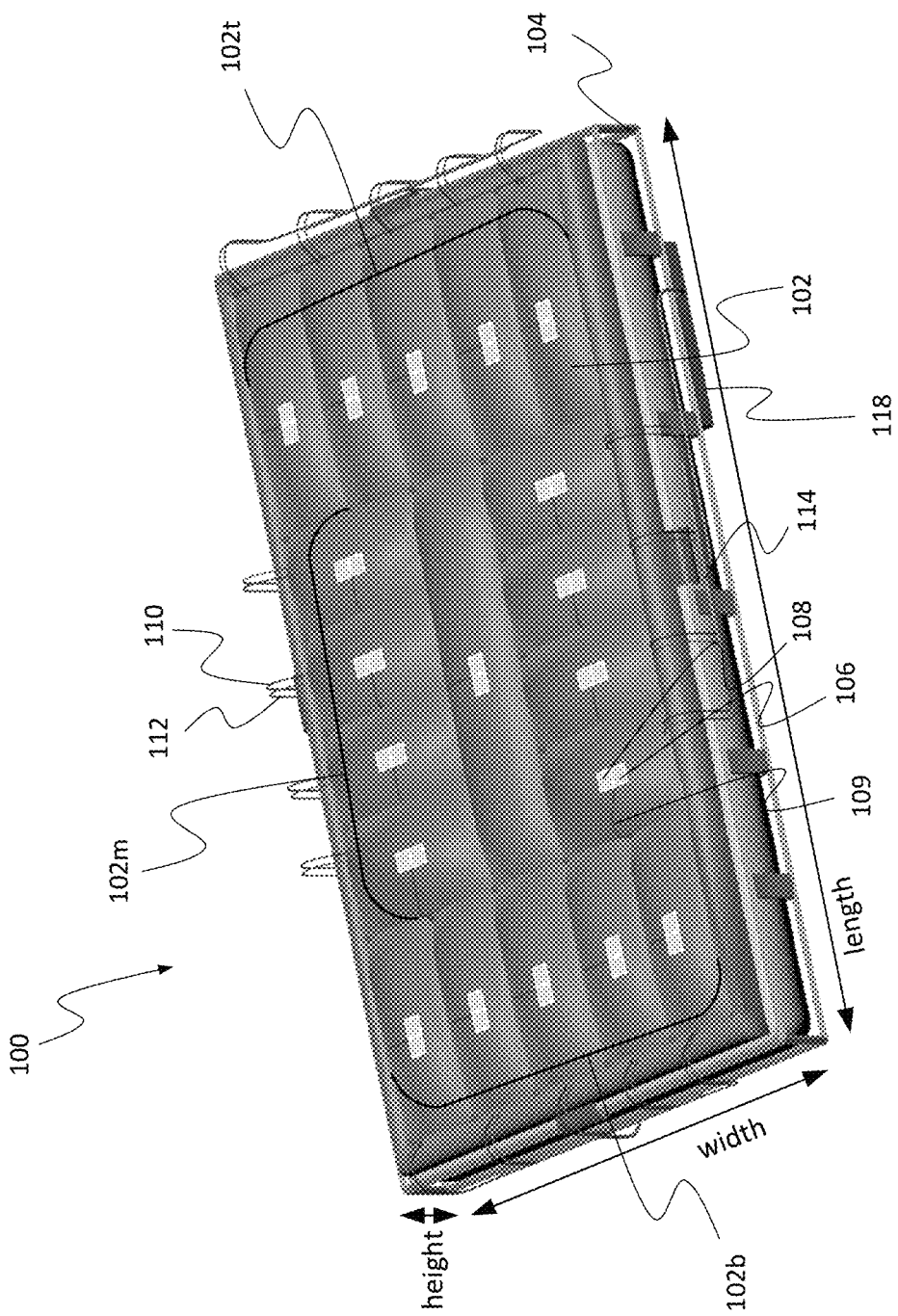
FIG. 1 is a schematic perspective view from above of an example mattress assembly showing an arrangement of the chambers.

FIG. 1 is a perspective view of an example mattress assembly 100. The mattress assembly 100 includes a number of air chambers 102 supported by a frame 104. The air chambers 102 fit together within the frame 104 so that, collectively, the top surface of the air chambers 102 form a mattress surface for supporting a person. As discussed in more detail below, the pressure and temperature of each chamber 102 are adjustable independent of the temperature and pressure of the other chambers.

In general, the frame 104 is sized to provide a mattress surface of an appropriate size (e.g., corresponding to a standard mattress size). For example, in some embodiments, frame 104 is approximately 2 meters (m) in length, 90 centimeters (cm) in width, and 15 cm in height. The frame 104 can have other dimensions, for example, the frame 104 can be between 1.8 and 2.2 m in length, between 80 cm and 160 cm in width, and between 10 cm and 30 cm in height. The frame 104 supports and contains the lateral expansion of the included air chambers 102 and is composed of materials of sufficient rigidity to provide such support. Common examples of frame construction materials can include wood, a metal or metal alloy (e.g., stainless steel), and/or plastic (e.g., acrylic or polystyrene). In some implementations, the mattress assembly 100 can be constructed to match the dimensions of an existing bed frame, e.g., a hospice bed, a hospital bed, or a user bed in a home environment. In such implementations the mattress assembly 100 is then disposed within and supported by the existing frame.

The assembly 100 includes nineteen air chambers 102 within the interior volume of the frame 104. More generally, the number of air chambers 102 can vary based upon the size of the frame 104, the size of the air chambers 102, and the number of independently adjustable surfaces desired for the assembly. For example, a smaller frame 104 can include fewer air chambers 102 where a larger frame 104 can include more. The air chambers 102 are composed of a flexible, durable material such as woven nylon, polyester, polyvinyl chloride (PVC), or textile-reinforced urethane plastic, or rubber, and are capable of holding a pressure of between 0.01 and 10 psi (e.g., 0.05 to 10 psi, 0.1 to 10 psi, 1 to 10 psi, 5 to 10 psi, 0.01 and 5 psi, 0.01 and 1 psi, 0.01 and 0.1 psi, or 0.01 and 0.05 psi).

The exterior dimensions of the air chambers 102 can be modular and specific to a particular frame design. The chambers 102 of FIG. 1 each have a rectangular top surface, though other geometric profiles, such as square, or hexagonal, can be constructed. Generally, each chamber 102 can have the same shape and/or size, or the assembly can be composed of chambers having different sizes and/or shapes. Assembly 100, for example, at one end along its length, has a top row 102t of five chambers 102 each having the same size. At the opposite end of its length, assembly 100 is composed of another row 102b of five chambers 102 each having the same size, but being a different from the size of the chambers 102 in row 102t. Between rows 102t and 102b is a middle region 102m composed of two rows of four chambers each having the same size and, the rows being arranged along opposite sides of the width of the assembly, the two rows being separated by a single, large chamber having a length that extends the entire length of the two rows of region 102m.

The height of the chambers 102 comes to a common level to define an extended planar surface for a recumbent user. In FIG. 1, the chambers 102 of the assembly 100 come to a common height with the height of the frame 104 (e.g., between 10 cm and 30 cm). The length and/or width of the pressurized air chambers 102 can be between 20 cm and 100 cm (e.g., between 30 cm and 90 cm, between 40 cm and 80 cm, or between 50 cm and 70 cm). Furthermore, while assembly 100 has 19 total chambers, assemblies with fewer or more chambers are possible. Moreover, while chambers 102 are arranged packed so that each chamber sidewall is either in contact with another chamber's sidewall or with frame 104, in some embodiments, chambers can be separated by inactive spacers, e.g., compartments that provide part of the top surface of the mattress but without having an adjustable temperature and/or pressure.

Each air chamber 102 of the assembly connects to two air tubes, a hot air tube 110 and a cold air tube 112. During operation of the assembly 100, the hot air tube 110 carries heated air to the chamber 102 to raise the internal temperature of the chamber 102. Similarly, the cold air tube 112 carries cooled air to the chamber 102 to lower the internal temperature of the chamber 102. The hot air tubes 110 and cold air tubes 112 are composed of materials capable of holding the same pressures as the chambers 102, e.g., textile-reinforced urethane plastic, or rubber. The tube 110, 112 materials and dimensions are constructed based on operating conditions such a pressures, temperatures, and flow rate. For example, the tubes 110, 112 can have an inner diameter of between 0.25 cm and 2 cm. The hot air tube 110 and cold air tube 112 extend from each chamber 102 and are collectively retained in a tube conduit 114.

The tube conduit 114 is a hollow cylindrical conduit which contains and guides the hot air tubes 110 and cold air tubes 112 along a portion of their length to the regulator housing 118. The tube conduit 114 can have an inner diameter to enclose up to ten air tubes 110, 112, for example, between 2 cm and 10 cm. Tube conduit can be formed from a rigid material that protects tubes 110 and 102, such as a metal, metal alloy, or rigid plastic.

The air chambers 102 in the assembly 100 constitute a common surface providing an area for a user to lay recumbent. Disposed on the exposed surface of each air chamber 102 is a composite sensor, constituting a force pressure sensor 106 and a temperature sensor 108. FIG. 1 depicts the force pressure sensor 106 and temperature sensor 108 of the composite sensor disposed centrally to each air chamber 102 and a communication wire 109 extending from a housing of the composite sensor. Alternatively, the force pressure sensor 106 and temperature sensor 108 can be independently disposed on the air chamber 102 at any point on the surface with independent communication wires. In some implementations, the composite sensor can use a wireless connection protocol to communicate with a controller of the mattress assembly 100, e.g., WiFi, or Bluetooth®.

The force pressure sensor 106 is a sensor capable of sensing applied force over a surface area and can include piezoelectric, resistive, or capacitive load cells capable of sensing the pressure ranges expected in unloaded and user-loaded arrangements, for example, 0 psi to 10 psi for each air chamber. The temperature sensor 106 can be capable of sensing temperature over a surface area or at a point and can include negative temperature coefficient (NTC) thermistor, resistance thermometer, or thermocouple capable of sensing temperature in the range of 0° C. to 100° C.

Figure 2:
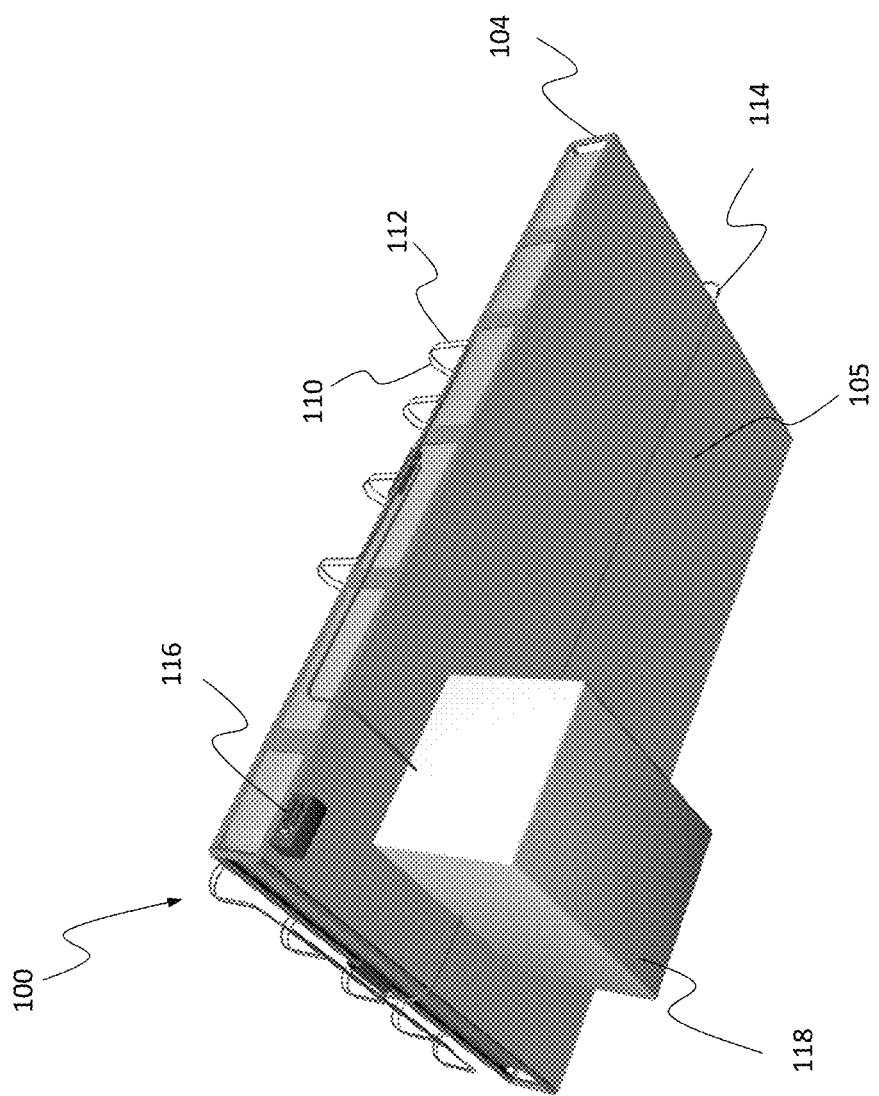
FIG. 2 is a schematic perspective view from below of the mattress assembly showing the chamber support, controller, and pressure control housing.

FIG. 2 shows a perspective view of the underside of the assembly 100, including the frame 104, the air tubes 110, 112, and tube conduit 114. FIG. 2 further shows a regulator housing 118 and a controller 116. The underside of frame 104 depicted has a single, continuous flat platform 105 supporting the chambers 102 and can be composed of the same material as the sidewalls of the frame, or it can be composed of a different material. Alternatively, the frame 104 can have a multiple supporting slats extending along the length or width of the frame. The platform 105 can also provide a surface for supporting the tube conduits 114 at least those portions that extending beneath the frame 104 to the regulator housing 118.

The controller 116 is affixed to a surface of the frame 104 at an edge of the frame so it is readily accessible. More generally, other placements are possible. For example, the controller 116 can be at any location that maintains wired or wireless communication with the chamber regulators. The controller 116 provides a user interface for control of the assembly 100, and a control hub for wired or wireless communication with a remote control (not shown, described further herein).

The controller 116 can include a graphical display for displaying temperature and pressure values of one or more of the chambers 102 of the assembly 100. The graphical display can additionally be a display that a user can control by touching the screen with one or more fingers, e.g., a touchscreen. The controller 116 can further includes one or more manual controls with which a user or clinician can control the temperature and pressure of the chambers 102 of the assembly 100. Examples of manual controls can include a number pad, buttons, dials, switches, sliders, or keypad.

The regulator housing 118 is a rigid enclosure containing the one or more chamber regulators for controlling the temperature and pressure of connected chambers 102. The regulator housing 118 can be composed of the same material as the frame 104, or a different material. The housing 118 is sized to contain a number of chamber regulators that is equal to the number of chambers 102 in the assembly 100.

Figure 3:
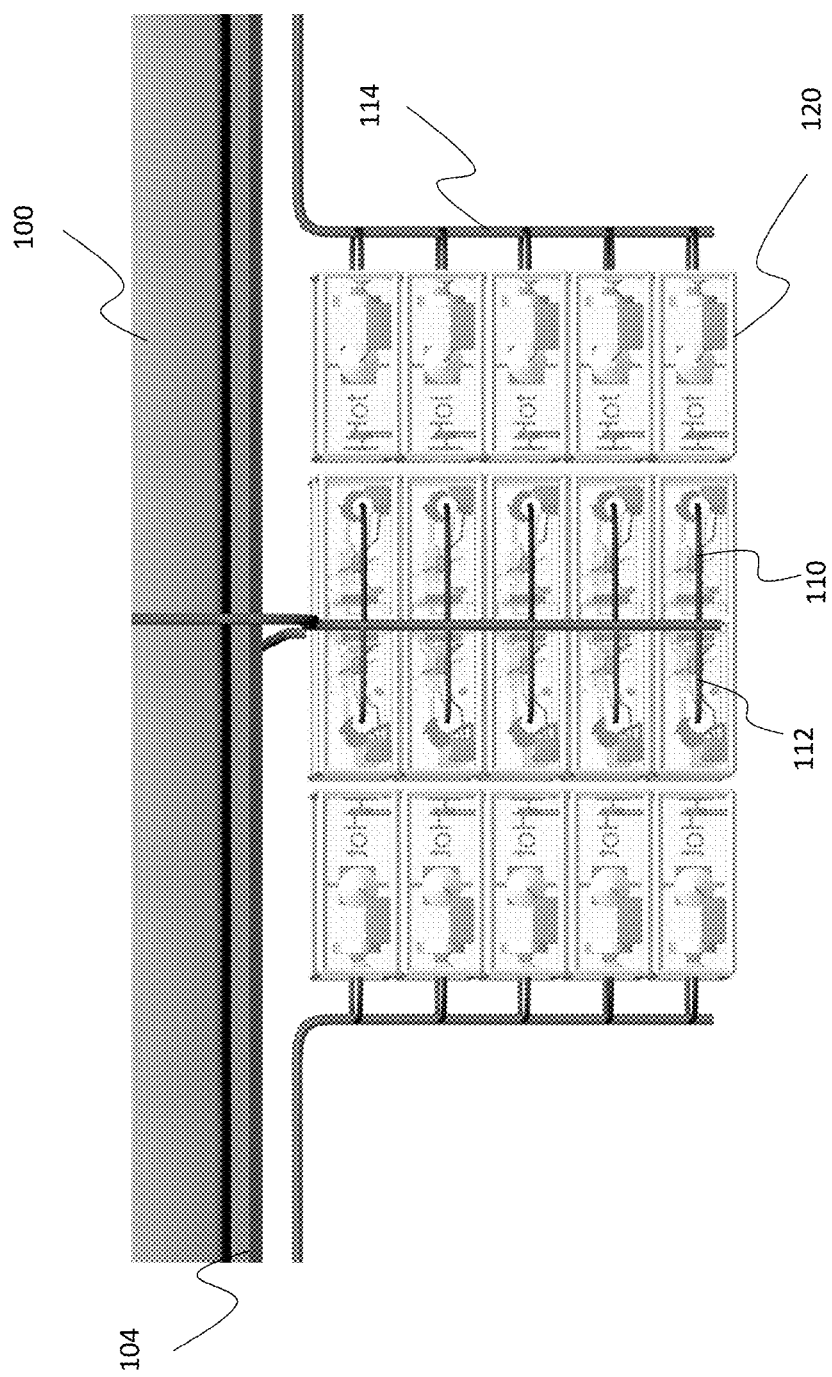
FIG. 3 is a cut-away schematic view of the interior of the chamber pressure control unit detailing arrangement of individual chamber pressure control units within the pressure control housing.

FIG. 3 shows a cut-away view of the interior of the housing 118 containing chamber regulators 120. The chamber regulators 120 are arranged in a regular array within the interior volume of the housing 118. In general, the chamber regulators can be arranged in any suitable geometric shape, such as a cube or cuboid. Hot air tubes 110 and cold air tubes 112 extend from the tube conduit 114 and paired hot 110 and cold air tubes 112 from a single air chamber 102 terminate at ports on opposing sides of an individual chamber regulator 120.

Figure 4:
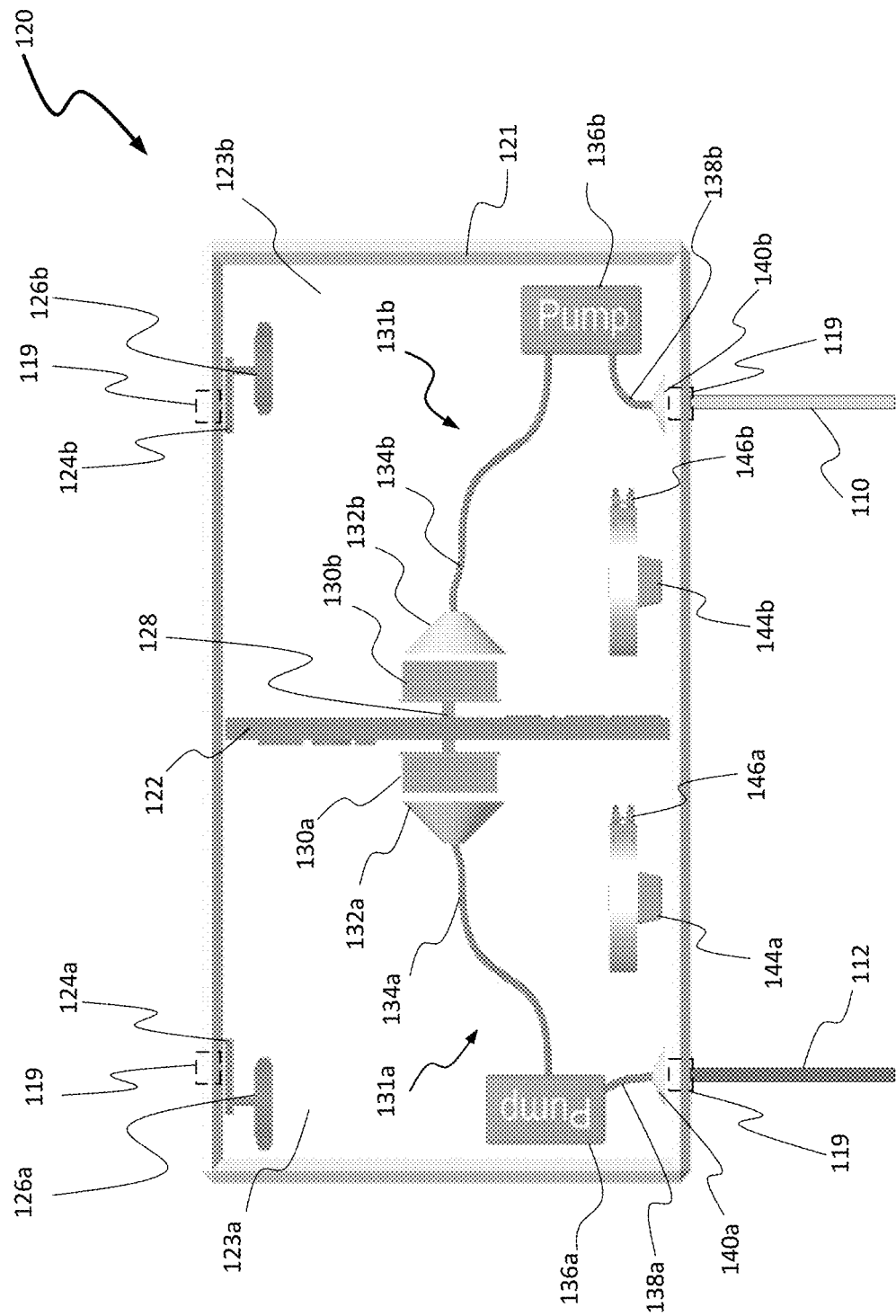
FIG. 4 is a schematic view of an example chamber pressure control unit from above.

FIG. 4 is a top-down cutaway view of an example chamber regulator 120. The chamber regulator 120 includes a case 121 with four ports 119 providing access to compartments 123a, 123b in the interior of the case 121. Each compartment has two ports 119 on opposing sides of the case 121. The hot air tube 110 connects to a port 119 of compartment 123b and the cold air tube 112 connects to a port of compartment 123a on the same side of case 121. The two ports 119 on the opposing side of case 121 connect the respective compartment to the external environment and aid in regulating pressure within the respective compartment.

A divider 122 separates the interior volume of the case 121 into the two compartments 123a, 123b, each compartment containing a body of gas. Each compartment 123a, 123b further contains a number of components for regulating the pressure and temperature of the corresponding chamber 102 connected to the regulator by the hot air tube 110 and cold air tube 112. One compartment 123a produces and drives chilled air to the connected chamber 102 via the cold air tube 112, thereby reducing the air temperature within the chamber 102. The opposing compartment 123b produces and drives heated air to the connected chamber 102 via the hot air tube 110, thereby increasing the air temperature within the chamber 102.

The regulator 120 includes a heating exchanger element 128, which can be a thermoelectric element, e.g., a Peltier device. In general, the thermoelectric element 128 is solid-state active heat pump which creates a heat flux at the junction of two unique semiconductors, one n-type and one p-type, when a DC electric current flows through the element. This effect transfers heat from one side of the device to the other, heating one side and cooling the other.

The thermoelectric element 128 spans the divider 122 such that one surface is disposed within a first compartment and the second surface is disposed within the opposing compartment. For example, the thermoelectric element 128 can be connected to a power supply in a manner such that the heated side of the thermoelectric element 128 is within the heated compartment 123b and the cooled side of the thermoelectric element 128 is within the cooled compartment 123a. This arrangement allows for one compartment to be heated, e.g., 123b, while the opposing compartment is cooled, e.g., 123a.

Attached to the thermoelectric element 128 are a heat sinks 130a, 130b. The heat sinks 130a, 130b are passive heat exchangers with high thermal conductivity, such as an extruded or milled block of aluminum or aluminum alloy. In general, a passive heat sink transfers heat energy away from a heat source and to a heat sink.

In regulator 120, the heat sink 130a disposed in the cooled compartment 123a transfers heat energy from the surrounding air into the cooled side of the thermoelectric element, thereby cooling the air in the cooled compartment 128a. The heat sink 130b disposed in the heated compartment 123b transfers heat energy from the device 128 to the surrounding air, thereby heating the air in the heated compartment 128b.

Air pump assemblies 131a, 131b are disposed in compartments 128a, 128b, respectively, and operate to pump air from adjacent the heat sinks 130a, 130b to the hot air line 110 and cold air line 112, respectively, when instructed by the controller 116. An example pump assembly 131 includes an air pump 136, an intake cone 132, an intake hose 134, an exhaust hose 138, and an exhaust cone 140. Any suitable pump can be used. For example, the air pumps 136a, 136b can be diaphragm pumps. The flow rate of the air pumps 136a, 136b is sufficient to alter the pressure within a connected chamber 102 within a short time (e.g., within a few seconds) of receiving instructions from the controller 116. For example, the flow rate of the air pumps 136 can be between 1 and 50 liters/min.

The air pumps 136a, 136b have an intake port and an exhaust port. The intake port of the air pumps 136a, 136b connect to intake hoses 134a, 134b. The intake hoses extend from the intake port of the air pumps 136a, 136b to intake cones 132a, 132b disposed adjacent to the heat sinks 130a, 130b. The exhaust ports of the air pumps 136a, 136b connect to exhaust hoses 138a, 138b extending to exhaust cones 140a, 140b.

When the air pumps 136a, 136b of the pump assemblies 131a, 131b operate following instruction from the controller 116, air is drawn into the intake cones 132a, 132b, through the intake hoses 134a, 134b, into the intake ports and out the exhaust ports of the air pumps 136a, 136b, into the exhaust hoses 138a, 138b, out the exhaust cones 140a, 140b.

The pump assembly 131a in compartment 123a pumps cooled air from the cooling heat sink 130a to the connected chamber 102. The pump assembly 131b in compartment 123b pumps heated air from the heated heat sink 130b to the connected chamber 102.

The regulator 120 further includes a fan 144 in each compartment 123a, b to circulate the heated or cooled air within the respective compartment. The air the fan 144 circulates homogenizes the temperature within each compartment 123. A switch 146 attached to the hood of each fan 144 controls the operational state of the fan 144, the switch regulated by the controller 116.

Figure 5:
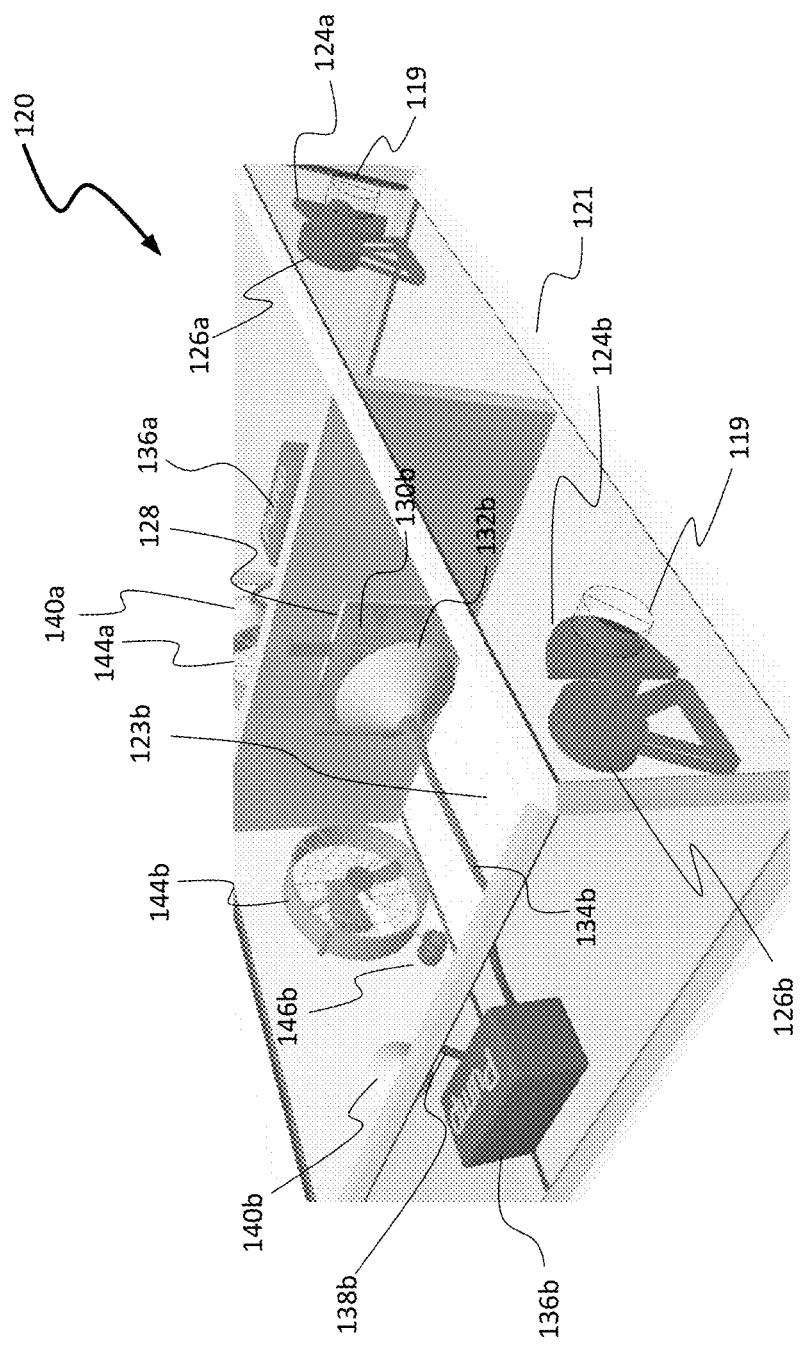
FIG. 5 is a schematic perspective view of individual components of a first half of the chamber pressure control unit of FIG. 4.

Positioned adjacent to the surface opposite the fan 144 is a servo motor 126 with an affixed gate 124. FIG. 5 is a perspective view of the interior of one chamber 123b and the external surface of the regulator 120. One surface of the gate 124 is situated parallel to the surface of the case 121 and in register with the port 119 open to the external environment. The servo motor 126b controls the position of the gate 124b. FIG. 5 depicts the gate 124b in a 'closed' state, blocking the port 119. Following instructions by the controller 116, the servo motor 126b can actuate the gate 124b between a 'closed' state and an 'open' state, wherein the gate 124b does not block the port 119.

The servo motor 126 and gate 124 control the air flow through the external environment ports 119. The servo motor 126b can be a rotational servo motor wherein the gate is spun on an axis around the center of the servo motor 126b thereby exposing the port 119. Alternatively, the servo motor 126b can be a linear servo motor wherein the gate moves along an axis parallel with the case 121 surface to the surface, thereby exposing the port 119.

By exposing the compartments 123a or 123b to the external environment, the servo motor 126 and gate 124 regulate the internal compartment temperatures. In some implementations, the servo motor 126 and gate 124 can be operated to allow air to be drawn into the internal compartment when the regulator 120 is driving heated or cooled air into the connected chamber 102.

Figure 6:
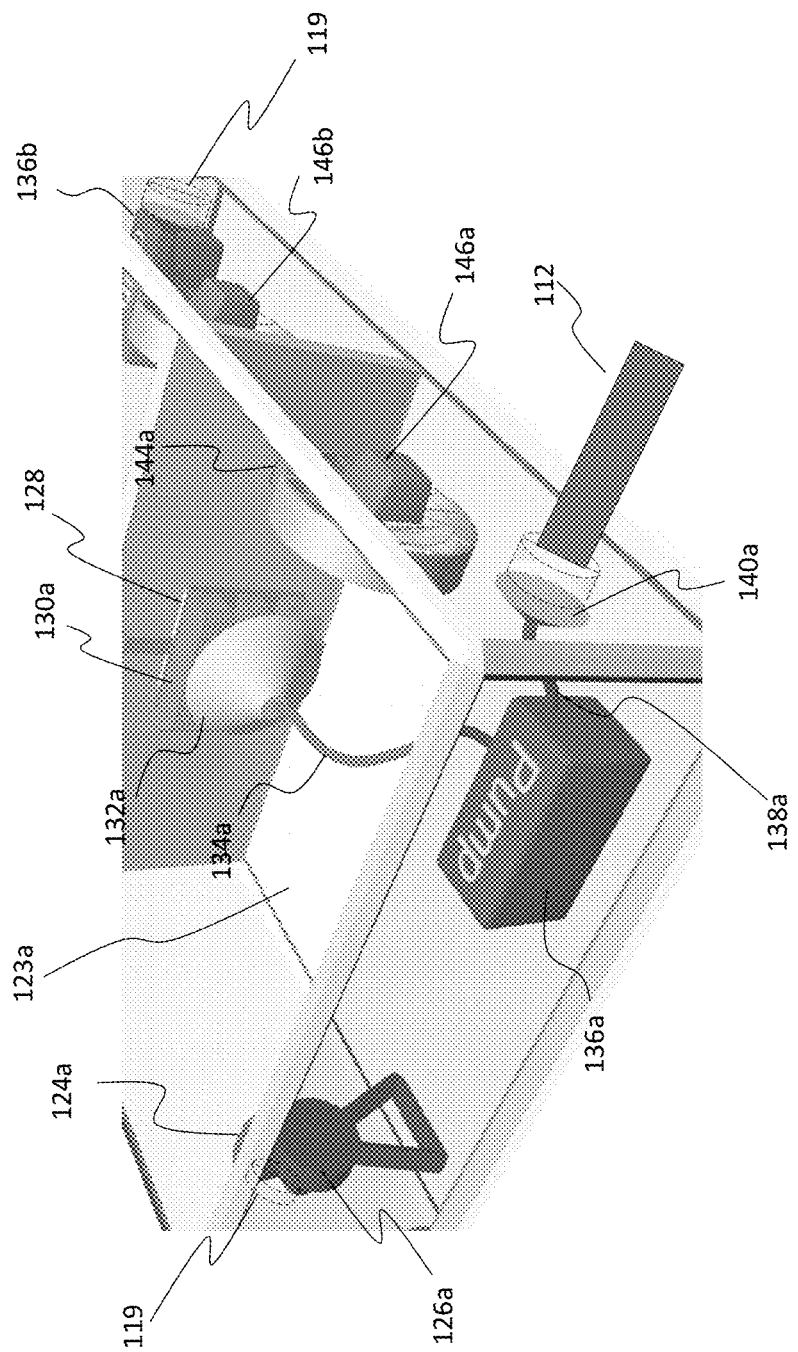
FIG. 6 is a schematic perspective view of individual components of a second half of the chamber pressure control unit of FIG. 4.

Further detail of compartment 123a and the opposing surface of the case 121 is shown in FIG. 6. The exhaust cone 140a of the air pump assembly 131a adjoins the port 119 facing the cold air tube 112 and directs air driven from the pump assembly 131a to the cold air tube 112.

Figure 7:
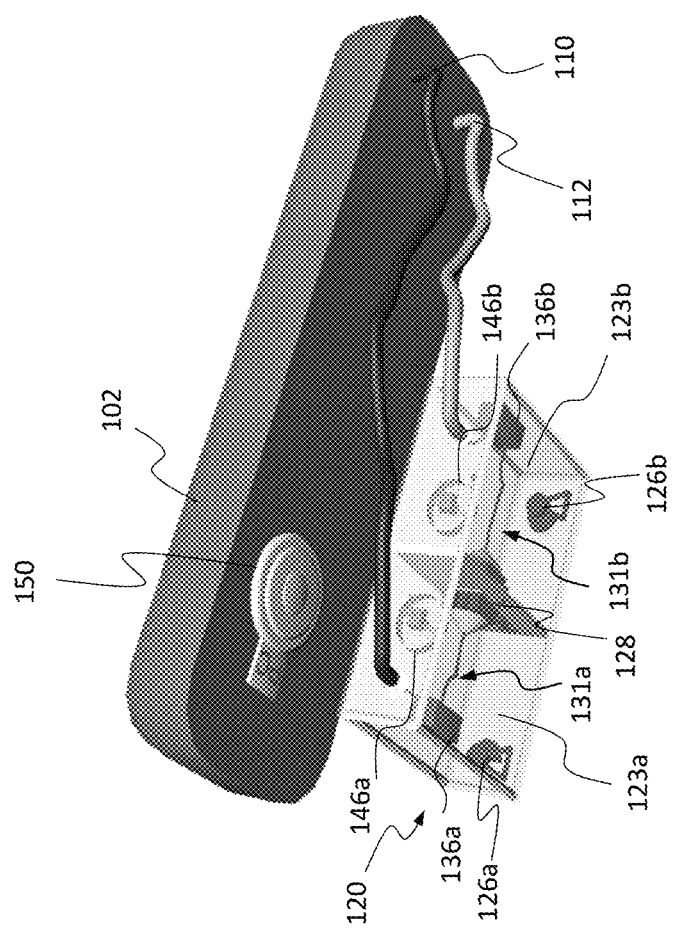
FIG. 7 is a schematic perspective view from below of an example chamber pressure control unit connected to a chamber.

FIG. 7 depicts an example air circuit connecting an air chamber 102 to the regulator 120 via a hot air tube 110 and a cold air tube 112. The relative spatial orientation and separation between can vary as appropriate and the depicted spatial relationship is illustrative only. The length of the hot air tube 110 and cold air tube 112 is also varies based on the respective positions of the two components. The hot air tube 110 and cold air tube 112 are connected to chamber 102 at a back surface of the chamber (i.e., opposite the top surface that forms part of the top surface of the mattress) at locations equidistant to a longitudinal end of the air chamber 102, though more generally the location of the connection points can vary. In general, the hot air tube 110 and cold air tube 112 connections can be located at any point along the back surface, or side surfaces, of the air chamber 102.

The back surface of the chamber 102 in FIG. 7 includes an air pressure sensor 150. Generally, the air pressure sensor 150 can be located at any position along the back surface of the chamber 102. Air pressure sensor 150 reads the air pressure within the chamber 102. The air pressure sensor 150 can be in wired or wireless communication with the controller 116 and communicates the air pressure within the chamber 102 to the controller 116.

The regulator 120 controls (e.g., maintains and/or varies) the pressure and temperature of the air chamber 102 to achieve a comfortable surface for the recumbent user and reduce the occurrence or severity of decubitus ulcers. The regulator varies the pressure and temperature by pumping heated or cooled air into the chamber through the hot air tube 110 and cold air tube 112. For example, the regulator 120 can vary the pressure of the air chamber 102 by pumping air through the hot air tube 110 or cold air tube 112, or both. To decrease the pressure of the air chamber 102, the servo motors 126a, 126b actuate the gates 124a, 124b into an 'open' position, exposing the ports 119 opposing the hot air tube 110 and cold air tube 112. The pump assemblies 131a, 131b then draw air from the air chamber 102 and into the regulator 120 where the air flows through the opened ports 119 adjacent the servo motors 126a, 126b.

To increase the pressure of the air chamber 102, the servo motors 126a, 126b actuate the gates 124a, 124b into an 'open' position, exposing the ports 119 opposing the hot air tube 110 and cold air tube 112. The pump assemblies 131a, 131b then drive air from the regulator 120 and into the air chamber 102. The controller 116 determines when the regulated pressure has been reached within the air chamber 102 and sends instructions to the regulator 120 to actuate the gates 124a, 124b into a 'closed' position and terminate the action of pump assemblies 131a, 131b.

The regulator 120 also controls the temperature of the air within the interior volume of the air chamber 102 according to instructions from the controller 116. To increase the temperature of the air within the interior volume of the air chamber 102, the regulator 120 operates the thermoelectric element 128 creating a heat flux from compartment 123b to compartment 123a, and into the heat sink 130a. The heat sink 130a heats the air surrounding the heat sink 130a and pump assembly 131a drives the heated air into the hot air tube 110 and into the air chamber 102, thereby increasing the air temperature within the interior volume of the air chamber 102.

In some embodiments, the regulator 102 can cause pump assembly 131b to draw non-heated air from the interior volume of the air chamber 102 through the cold air tube 112 and into compartment 123b. The regulator can additionally actuate the gate 124b to an 'open' position to further increase the air exchange rate within the air chamber 102.

To decrease the temperature of the air within the interior volume of the air chamber 102, the regulator 120 operates the thermoelectric element 128 creating a heat flux from creating a heat flux from compartment 123b to compartment 123a, thereby cooling heat sink 130b. The cooled heat sink 130b cools the air surrounding the heat sink 130b and pump assembly 131b drives the cooled air into the cold air tube 110 and into the air chamber 102, thereby decreasing the air temperature within the interior volume of the air chamber 102.

In some embodiments, the regulator 102 can cause pump assembly 131a to draw non-cooled air from the interior volume of the air chamber 102 through the hot air tube 112 and into compartment 123a. The regulator can additionally actuate the gate 124a to an 'open' position to further increase the air exchange rate within the air chamber 102.

Figure 8:
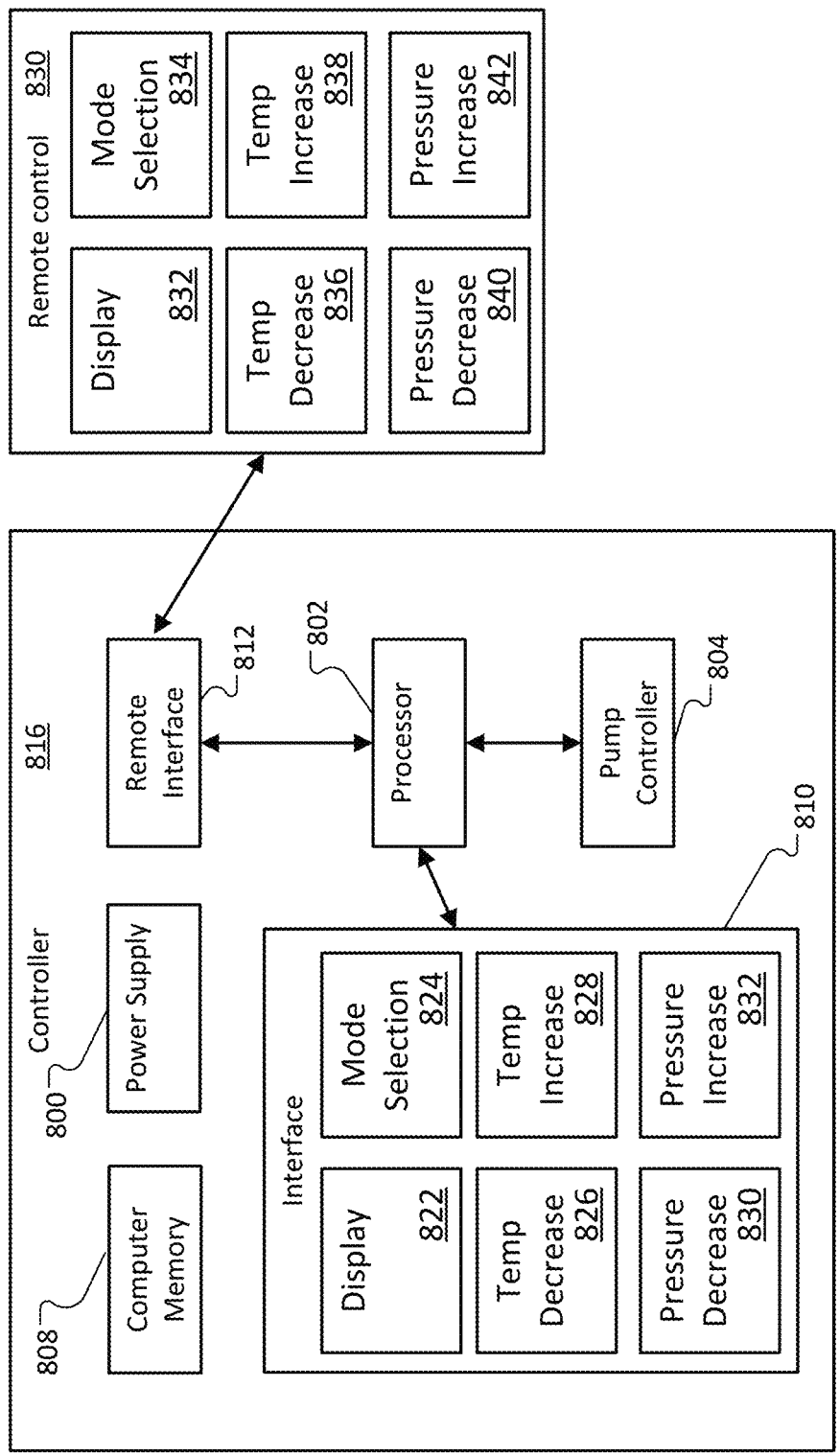
FIG. 8 is a block diagram of an exemplary controller and remote control system that can be used with the mattress assembly.

FIG. 8 is a block diagram of an example controller 816 of the mattress assembly 100. The controller 816 includes a power supply 800, a processor 802, and computer memory 806. In general, the power supply includes hardware used to receive electrical power from an outside source and supply it to components of the control board. The power supply can include, for example, a battery pack and/or wall outlet adapter, an AC to DC converter, a DC to AC converter, a power conditioner, a capacitor bank, and/or one or more interfaces for providing power in the current type, voltage, etc., needed by other components of the control board.

The processor 802 is generally a device for receiving input, performing logical operations on data, and providing output. The processor 802 can be a central processing unit, a microprocessor, general purpose logic circuitry, application-specific integrated circuitry, a combination of these, and/or other hardware for performing the functionality needed.

The memory 806 is generally one or more devices for storing data. The memory 806 can include long term stable data storage (e.g., on a hard disk), short term unstable (e.g., on Random Access Memory) or any other technologically appropriate configuration.

The controller includes a pump controller 804 in communication with the one or more chamber regulators 120. The pump controller 804 can receive commands from the processor 802 and, in response, control the function of one or more of the chamber regulators 120. For example, the pump controller 804 can receive, from the processor 802, a command to increase the pressure of an air chamber by 0.3 pounds per square inch (PSI). The pump controller 804, in response, engages a valve so that the chamber regulators 120 is configured to pump air into the corresponding air chamber, and can engage the chamber regulators 120 for a length of time that corresponds to 0.3 PSI or until a sensor indicates that pressure has been increased by 0.3 PSI. In an alternative configuration, the message can specify that the chamber should be inflated to a target PSI, and the pump controller 804 can engage the one or more chamber regulator 120 until the target PSI is reached.

The controller 816 includes an interface 810 to allow a user to provide inputs or read outputs from the components of the mattress assembly 800 directly from the controller 816. The interface 810 can include a display 822, a mode selection mechanism 824, a temperature increase button 826, a temperature decrease button 828, a pressure increase button 830, and a pressure decrease button 832.

The display 822 displays information from the processor 802 including information on chamber pressure, temperature, or user position. The mode selection mechanism 828 can allow the user to switch between a manual pressure/temperature adjustment mode, or an automatic pressure/temperature adjustment mode. In the manual pressure/temperature adjustment mode, the user can control the pressure, or temperature of one or more chambers 102 by inputting information through the display 822 or through a series of manual controls including controls 826, 828, 830, or 832. For example, the mode selecting mechanism 828, temperature increase button 826, temperature decrease button 828, pressure increase button 830, and pressure decrease button 832 can by a physical controls (e.g., switch or button) or an input control displayed on display 826.

A remote interface 812 of the control board can allow the control board to communicate with other components of a control system. For example, the control board can be able to communicate with peripheral sensors, and/or with peripheral controllers through the remote interface 812. The remote interface 810 can provide any technologically appropriate communication interface, including but not limited to multiple communication interfaces such as WiFi, Bluetooth®, and copper wired networks.

In some implementations, the user of the mattress assembly 100 can use an input device, such as the remote control 830 in communication with the remote interface 812 to accept commands for the controller 816 to input a desired temperature for the surface of the bed 112 (or for a portion of the surface of the bed 112). The desired temperature can be encapsulated in a command data structure that includes the desired temperature as well as identifies the chamber regulator as the desired component to be controlled. The command data structure can then be transmitted via Bluetooth or another suitable communication protocol to the processor 136. In various examples, the command data structure is encrypted before being transmitted. The chamber regulator can then configure its elements to increase or decrease the temperature of the pad depending on the temperature input into remote control 122 by the user.

In some implementations, data can be transmitted from a component back to the processor 802 or to one or more display devices, such as the display 822. For example, the current temperature as determined by a temperature sensor 108, the pressure of the bed of one or more chambers 102 determined by a pressure sensor 106, or other information can be transmitted to processor 802. The processor 802 can then transmit the received information to the remote control 830 where it can be displayed to the user (e.g., on the display 832).

Figure 9:
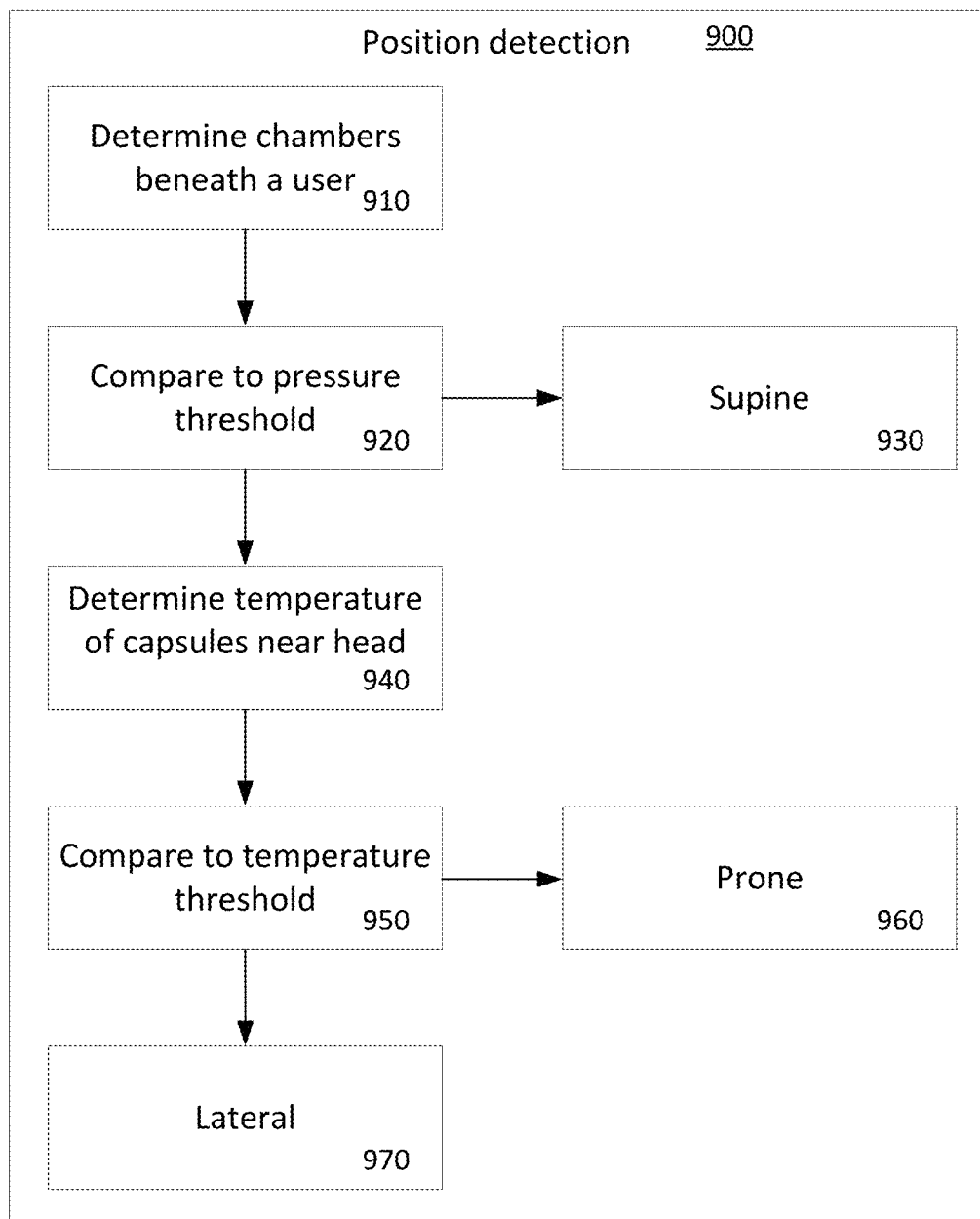
FIG. 9 is a flowchart detailing operational steps of an example positional detection system.

In general, the controller 116 of the mattress assembly 100 holds in computer memory 8wq 08 an algorithm for determining the positional state of a user, e.g., determining between a prone, supine, or a lateral position (e.g., on their side). FIG. 9 is a flowchart detailing an example process by which the controller determines the positional state of a user.

Position detection 900 begins after the controller receives a command to begin the process of determining a position. For example, a user can initiate position detection 900 through interaction with the controller, remotely with the remote control 830, or on a pre-programmed schedule loaded in the media storage of the controller.

In step 910, the controller determines the chambers that are disposed beneath a recumbent user. The controller reads the pressure data from the pressure sensors 150 and 106 corresponding to all chambers 102 of the assembly 100 to determine which chambers 102 are at a pressure level indicative of a portion of the users mass disposed on the chamber 102. For example, this can include a pressure level within a chamber 102 being higher than adjacent chambers 102, higher than a pre-programmed threshold, or higher pressure than a user-defined threshold (e.g., higher than 1 psi, higher than 1.5 psi, higher than 2 psi, or higher than 2.5 psi). If a chamber 102 is determined to be disposed beneath a portion of the user, the controller 116 sets an occupancy value for the corresponding chamber 102. The occupancy value can be a binary value, a numerical value, or any value capable of differentiating between chambers 102 disposed and not disposed beneath a portion of a user, e.g., an occupancy state.

Upon determination of an occupancy value for a chamber 102, the controller 116 begins an occupancy timer for the corresponding chamber 102. For the duration that the occupancy value indicates a user is disposed on the top surface of a chamber 102, the controller 116 can store the duration in an occupancy-time data.

In some implementations, pre-programmed thresholds can be used to determine the chambers disposed beneath a user and the orientation of the user recumbent on the assembly 100. For example, a minimum pressure level of 90 mmHg (1.7 psi) can be set to correspond to a chamber 102 disposed beneath the hips of a user; a minimum pressure level of 80 mmHg (1.5 psi) can be set to correspond to a chamber 102 disposed beneath the shoulders of a user; and a minimum pressure level of 75 mmHg (1.4 psi) can be set to correspond to a chamber 102 disposed beneath the feet of a user. From these determinations, the controller estimates the position of the head using the position of the feet and the position of the shoulders.

The controller compares the pressure within the chambers determined to be disposed beneath the user to the pre-programmed thresholds 920. If the pressure chambers determined to be disposed beneath the user is higher than one or more of the pre-programmed thresholds, the controller determines that the user is in a supine position 930. If one or more pressures within the chambers determined to be disposed beneath the user do not meet the pre-programmed thresholds, the controller determines that the user is not supine and continues the determination of the positional state of the user.

The controller determines the temperature of the surface of the capsules 102 determined to the near the head of the user 940. The controller reads the temperature data from the temperature sensors 108 corresponding to the chambers 102 estimated to be under the head of the user. The controller compares the temperature data to a temperature threshold. For example, the temperature threshold can be above ambient temperature and below the average body temperature of a user and temperature data exceeding the temperature threshold indicates the presence of a user (e.g., 30° C., 32° C., 34° C., or 36° C.). In combination with the pressure data determined above, if the controller determines that the temperature data is greater than the temperature threshold and the pressure data is below the pressure threshold, the controller determines that the user is in a prone position 950.

If the controller determines that the temperature data is lower than or equal to the temperature threshold and the pressure data is below the pressure threshold, the controller determines that the user is in a laterally reclined position 970.

This information can be transmitted to a remote control 830 for display to the user.

Figure 10:
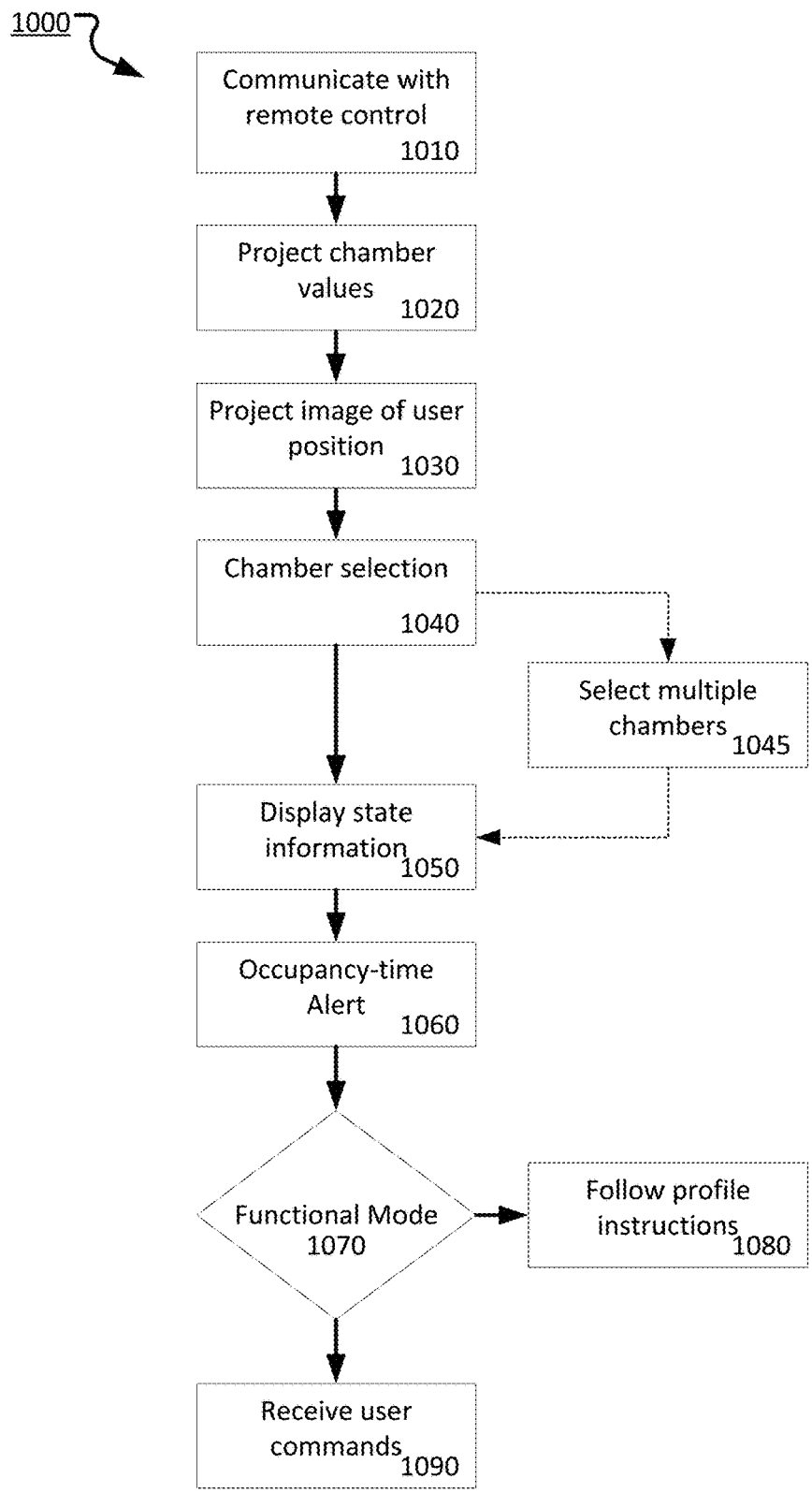
FIG. 10 is a flowchart detailing operational steps of an example remote control and sensing system.

The interface on remote control 830 can display information to the user facilitating adjustment of the mattress assembly by the user. FIG. 10 is a flowchart outlining an example user control interface process 1000 that a user can navigate to select various functions of the mattress assembly 100.

The controller 116 communicates with the remote control to establish a connection to transmit and receive data 1010. This can include a connection over various suitable communication interfaces such as WiFi, Bluetooth®, or a wired connection.

The controller 116 transmits chamber data, including pressure data, temperature data, occupancy value, and a chamber identification value identifying the chamber 102 in the mattress assembly 100 for one or more chambers 102 to the remote control 830. The remote control 1020 can be configured to receive the transmitted chamber data and display on the display 832 an image of the mattress assembly 100 including all chambers 102. The remote control 830 further displays the chamber data above any corresponding chambers 102 on the display. The user views the chamber data for one or more chambers 102 of the mattress assembly 100.

If the controller 116 has performed a positional-state determination as described in FIG. 9, the controller 116 can transmit positional-state data to the remote control 830. The remote control 830 can be configured to receive the positional-state data from the controller 116 and display an image corresponding to the positional-state of the user, e.g., supine, prone, or lateral. The image can include an outline of a person, an image of a user, or a graphical rendering of a user in a position corresponding to the positional-state of the user.

The user selects a displayed chamber 1040 by interacting with the remote control 830. This can include interacting with the display 832 or interacting with one or more buttons on the remote control 830. In some implementations, the user can select additional chambers 1045 by interacting with the remote control 830.

Responsive to the user selection of one or more chambers 102, the remote control 830 displays the at least one data or value of the state data 1050 corresponding to the selected one or more chambers 102. This can include pressure data, temperature data, occupancy value, occupancy-time data, or chamber identification value for the one or more selected chamber 102. In some implementations, the user can select which of the data or values stored in the state data for the corresponding one or more chambers 102 to be displayed on the display 832 of the remote control 830.

The controller 116 compares the occupancy-time data to an occupancy-time threshold value. If the occupancy-time data is greater than the occupancy-time threshold value, the controller 116 transmits to the remote control 830 a command to display an alert signal 1060. For example, the occupancy-time threshold can be a pre-programmed or user-input value to relieve compression from pain areas of a user (e.g., 10 min, 20 min, 30 min, 40 min, 50 min, or 60 min). Responsive to the command from the controller 116, the remote control 830 presents an alert signal to the user. The alert signal can include but is not limited to a sound played through a speaker of the remote control 830, a visual signal displayed on the display 832, or a tactile signal projected through a tactile device integrated in the remote control 830.

The alert signal can include occupancy-state values and occupancy-time data for one or more chambers 102 whose occupancy-time data is greater than the occupancy-time threshold.

Responsive to an alert signal, the remote control 830 displays a prompt on the display 832 for the selection of an automatic adjustment or a manual adjustment 1070 of the pressure and/or temperature in one or more chambers. The remote control 830 can display the prompt for a time period.

The user can select an automatic adjustment 1080 within the time period by interacting with the automatic adjustment prompt on the remote control 830. Responsive to the selection of an automatic adjustment, the remote control 830 transmits an automatic-response value to the controller 116. The automatic-response value can be encapsulated in a command data structure that instructs the controller 116 to command one or more chamber regulators to adjust the pressure and/or temperature in one or more associated chambers 102 responsive to an automatic adjustment profile stored in the computer memory 1008.

The automatic adjustment profile is a data structure containing pressure values, temperature values, and occupancy-time threshold values that the processor 1002 can use to send commands to one or more chamber regulators 120 to alter the conditions in one or more chambers. For example, if the occupancy-time value for a discrete chamber 102 exceeds the s stored in the automatic adjustment profile, the controller can responsively command the corresponding chamber regulator 120 to adjust the pressure within the connected chamber 102 by operating the pump 136 to drive or draw air from the connected chamber 102. The chamber regulator 120 operates the pump 136 until the pressure or temperature value within the chamber meets or exceeds the pressure or temperature value stored in the automatic adjustment profile. Once the pressure or temperature value stored in the profile is met or exceeded, the chamber regulator 120 ceases operation of the pump 136. This adjustment can be performed on one or more chambers 102 responsive to the values and thresholds stored within the automatic adjustment profile until the pressure or temperature values of the one or more chamber 102 meet or exceed the pressure or temperature value stored in the automatic adjustment profile.

The user can select a manual adjustment within the time period by interacting with the manual adjustment prompt on the remote control 830. Responsive to the selection of a manual adjustment, a user can issue one or more commands to the remote control 830 through the display 832 or other manual adjustment buttons. The user selects one or more chambers and inputs a target-pressure or target-temperature value for each chamber selected. The user can then trigger the remote control 830 to transmit a manual-adjustment value to the controller 116.

The remote control 830 transmits a manual-response value 1090 to the controller 116. The manual-response value can be encapsulated in a command data structure that instructs the controller 116 to command one or more chamber regulators to adjust the pressure and/or temperature in one or more associated chambers 102 responsive to the manual-response value from the remote control 830.

If the user fails to select an automatic adjustment or a manual adjustment within the time period, the remote control can transmit a failed-input value to the controller 116. Upon receiving a failed-input value from the remote control 830, the controller 116 can direct one or more chamber regulators to perform an adjustment according to the automatic adjustment profile stored in the computer memory 1008.

Figure 11:
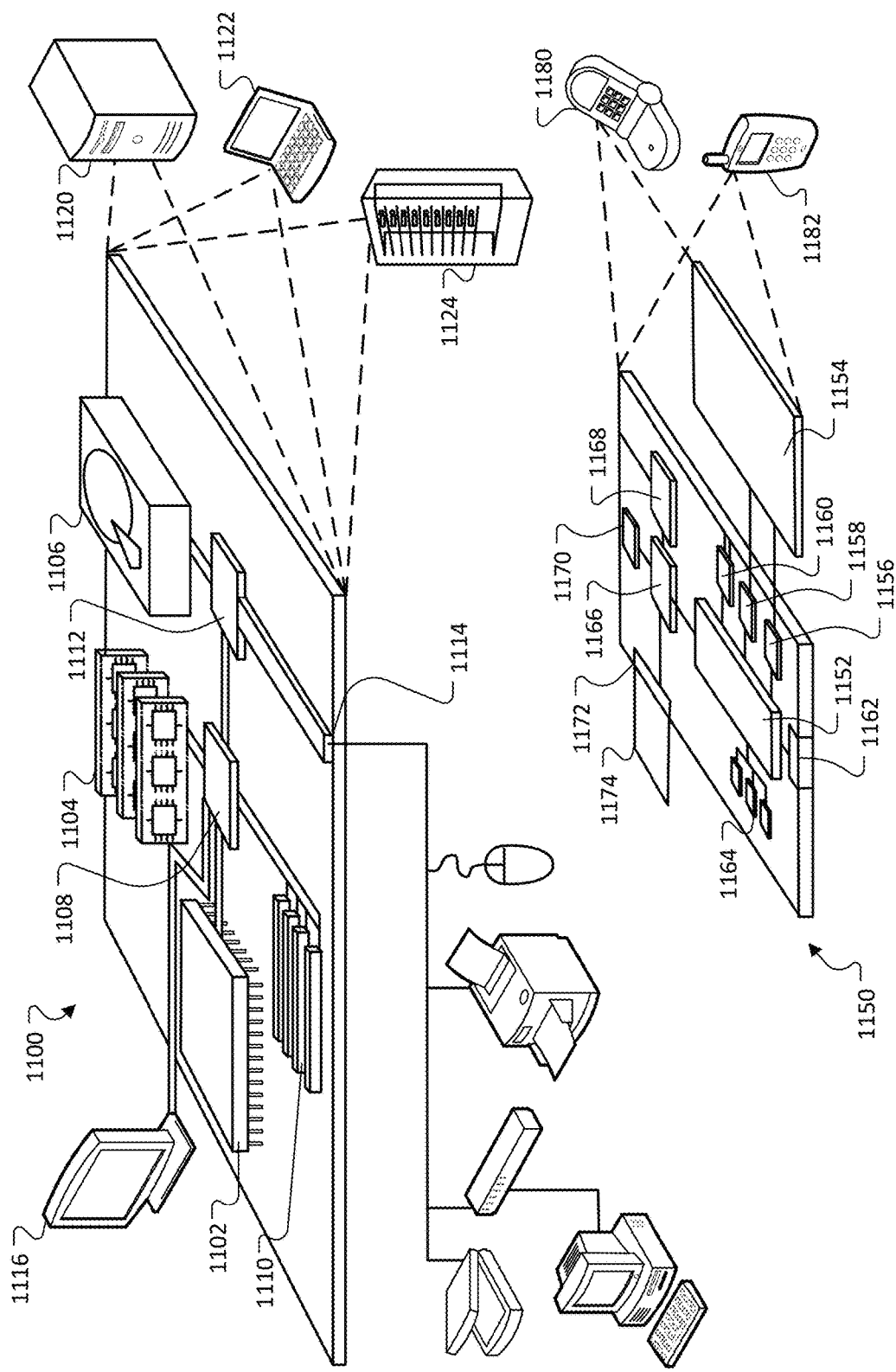
FIG. 11 is a schematic diagram that shows an example of a computing device and a mobile computing device.

As noted previously, the systems and methods disclosed above utilize a controller 116 as part of the customizable mattress assembly 100 described. Generally, controller 116 is or is part of a data processing apparatus, which processes data generated by and/or received by the mattress assembly. FIG. 11 shows an example of a computing device 1100 and a mobile computing device 1150 that can be used as data processing apparatuses to implement the techniques described here. The computing device 1100 is intended to represent various forms of digital computers, such as laptops, desktops, workstations, personal digital assistants, servers, blade servers, mainframes, and other appropriate computers. The mobile computing device 1150 is intended to represent various forms of mobile devices, such as personal digital assistants, cellular telephones, smartphones, and other similar computing devices. The components shown here, their connections and relationships, and their functions, are meant to be examples only, and are not meant to be limiting.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 may also be another form of computer-readable medium, such as a magnetic or optical disk.

The storage device 1106 is capable of providing mass storage for the computing device 1100. In some implementations, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1102), perform one or more methods, such as those described above. The instructions can also be stored by one or more storage devices such as computer- or machine-readable mediums (for example, the memory 1104, the storage device 1106, or memory on the processor 1102).

The high-speed interface 1108 manages bandwidth-intensive operations for the computing device 1100, while the low-speed interface 1112 manages lower bandwidth-intensive operations. Such allocation of functions is an example only. In some implementations, the high-speed interface 1108 is coupled to the memory 1104, the display 1116 (e.g., through a graphics processor or accelerator), and to the high-speed expansion ports 1110, which may accept various expansion cards (not shown). In the implementation, the low-speed interface 1112 is coupled to the storage device 1106 and the low-speed expansion port 1114. The low-speed expansion port 1114, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. In addition, it may be implemented in a personal computer such as a laptop computer 1122. It may also be implemented as part of a rack server system 1124. Alternatively, components from the computing device 1100 may be combined with other components in a mobile device (not shown), such as a mobile computing device 1150. Each of such devices may contain one or more of the computing device 1100 and the mobile computing device 1150, and an entire system may be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 may also be provided with a storage device, such as a micro-drive or other device, to provide additional storage. Each of the processor 1152, the memory 1164, the display 1154, the communication interface 1166, and the transceiver 1168, are interconnected using various buses, and several of the components may be mounted on a common motherboard or in other manners as appropriate.

The processor 1152 can execute instructions within the mobile computing device 1150, including instructions stored in the memory 1164. The processor 1152 may be implemented as a chipset of chips that include separate and multiple analog and digital processors. The processor 1152 may provide, for example, for coordination of the other components of the mobile computing device 1150, such as control of user interfaces, applications run by the mobile computing device 1150, and wireless communication by the mobile computing device 1150.

The processor 1152 may communicate with a user through a control interface 1158 and a display interface 1156 coupled to the display 1154. The display 1154 may be, for example, a TFT (Thin-Film-Transistor Liquid Crystal Display) display or an OLED (Organic Light Emitting Diode) display, or other appropriate display technology. The display interface 1156 may include appropriate circuitry for driving the display 1154 to present graphical and other information to a user. The control interface 1158 may receive commands from a user and convert them for submission to the processor 1152. In addition, an external interface 1162 may provide communication with the processor 1152, so as to enable near area communication of the mobile computing device 1150 with other devices. The external interface 1162 may provide, for example, for wired communication in some implementations, or for wireless communication in other implementations, and multiple interfaces may also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 may also be provided and connected to the mobile computing device 1150 through an expansion interface 1172, which may include, for example, a SIMM (Single In Line Memory Module) card interface. The expansion memory 1174 may provide extra storage space for the mobile computing device 1150, or may also store applications or other information for the mobile computing device 1150. Specifically, the expansion memory 1174 may include instructions to carry out or supplement the processes described above, and may include secure information also. Thus, for example, the expansion memory 1174 may be provide as a security module for the mobile computing device 1150, and may be programmed with instructions that permit secure use of the mobile computing device 1150. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 1152), perform one or more methods, such as those described above. The instructions can also be stored by one or more storage devices, such as one or more computer- or machine-readable mediums (for example, the memory 1164, the expansion memory 1174, or memory on the processor 1152). In some implementations, the instructions can be received in a propagated signal, for example, over the transceiver 1168 or the external interface 1162.

The mobile computing device 1150 may communicate wirelessly through the communication interface 1166, which may include digital signal processing circuitry where necessary. The communication interface 1166 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1168 using a radio-frequency. In addition, short-range communication may occur, such as using a Bluetooth, WiFi, or other such transceiver (not shown). In addition, a GPS (Global Positioning System) receiver module 1170 may provide additional navigation- and location-related wireless data to the mobile computing device 1150, which may be used as appropriate by applications running on the mobile computing device 1150.

The mobile computing device 1150 may also communicate audibly using an audio codec 1160, which may receive spoken information from a user and convert it to usable digital information. The audio codec 1160 may likewise generate audible sound for a user, such as through a speaker, e.g., in a handset of the mobile computing device 1150. Such sound may include sound from voice telephone calls, may include recorded sound (e.g., voice messages, music files, etc.) and may also include sound generated by applications operating on the mobile computing device 1150.

The mobile computing device 1150 may be implemented in a number of different forms, as shown in the figure. For example, it may be implemented as a cellular telephone 1180. It may also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., an OLED (organic light emitting diode) display or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing system can be cloud based and/or centrally processing data. In such case anonymous input and output data can be stored for further analysis. In a cloud based and/or processing center set-up, compared to distributed processing, it can be easier to ensure data quality, and accomplish maintenance and updates to the calculation engine, compliance to data privacy regulations and/or troubleshooting.

Other embodiments are in the following claims.

What is claimed is:

1. A mattress assembly, comprising:
    a plurality of gas-filled chambers each having a top surface, the top surfaces of the chambers collectively composing a top surface of the mattress assembly;
    a plurality of composite sensors, each composite sensor of the plurality of composite sensors being associated with a corresponding one of the plurality of the chambers, each composite sensor comprising:
        a pressure sensor arranged to measure a pressure at a wall of the corresponding chamber; and
        a temperature sensor arranged to measure a temperature of the corresponding chamber;
    a plurality of chamber regulators, each chamber regulator being in fluid communication with a corresponding one of the plurality of chambers, each chamber regulator being configured, during operation of the mattress assembly, to pump gas at a first temperature and gas at a second temperature to the corresponding chamber, the first temperature being greater than the second temperature, wherein each chamber regulator comprises a first compartment and a second compartment separated from the first compartment by a divider, the first compartment containing gas at the first temperature and the second compartment containing gas at the second temperature; and
    a controller in communication with the composite sensors and the chamber regulators, the controller being programmed to:
        receive, from at least one composite sensor of the plurality of composite sensors, state data comprising pressure and temperature information for the chamber corresponding to the at least one composite sensor;
        determine, based upon the received state data, an information about a patient's position relative to the corresponding chamber; and
        based on the patient's position, control the chamber regulator for the corresponding chamber to modify a pressure and/or a temperature of the corresponding chamber.

2. The assembly of claim 1, wherein each composite sensor further comprises a second pressure sensor arranged to measure a pressure at a second wall of the corresponding chamber, the second wall of the chamber opposing the wall at which the first pressure sensor measures the pressure.

3. The assembly of claim 1, wherein the divider comprises a heat exchanger arranged to transfer heat from the gas in the second compartment to the gas in the first compartment.

4. The assembly of claim 3, wherein the heat exchanger comprises a thermoelectric element.

5. The assembly of claim 1, wherein the information about the patient's position comprises an occupancy state for the corresponding chamber.

6. The assembly of claim 1, wherein the information about the patient's position comprises an occupancy-time value for the corresponding chamber.

7. The assembly of claim 6, wherein the controller is programmed to modify the temperature and/or pressure when the occupancy-time value exceeds an occupancy-time threshold value.

8. The assembly of claim 1, wherein the controller is programmed to adjust the temperature and pressure of each chamber according to an automatic adjustment profile established for a patient.

9. The assembly of claim 8, wherein the automatic adjustment profile comprises one or more threshold values for an occupancy-time for each chamber and the controller is programmed to adjust the temperature and/or pressure of a chamber when a threshold value for that chamber is exceeded.

10. The assembly of claim 1, further comprising a remote control in communication with the controller.

11. The assembly of claim 10, wherein the controller is programmed to adjust a pressure and/or temperature of one or more of the chambers based on commands received from the remote control.

12. The assembly of claim 11, wherein the remote control is mobile device.

13. The assembly of claim 1, wherein the top surface of the mattress assembly has a surface area in a range from 0.8 $m^2$ to 4 $m^2$.

14. A method, comprising:
    for each of a plurality of gas-filled chambers composing a surface of a mattress, monitoring a pressure and a temperature of the chamber;
    transferring heat between two bodies of gas each separately in fluid communication with the gas in a corresponding one of the chambers;

determining, based on the monitored pressure and temperature, a position of a patient on the mattress;

determining, based on the position of the patient on the mattress, whether the time the patient has remained in the same position exceeds a threshold; and modifying, when the time exceeds the threshold, a pressure and/or a temperature of at least one chamber of the plurality of chambers by transferring gas between at least one of the two bodies and the corresponding chamber.

15. The method of claim 14, wherein modifying the pressure and/or temperature comprises pumping gas at a first temperature into the chamber.

16. The method of claim 15, wherein the first temperature is higher than the monitored temperature of the chamber.

17. The method of claim 15, wherein the first temperature is lower than the monitored temperature of the chamber.

18. The method of claim 14, wherein modifying the pressure and/or temperature comprises drawing gas from the chamber.

* * * * *